Feb. 12, 1946.   F. A. CORBIN ET AL   2,394,595
APPARATUS FOR CONTROLLING THE PRESSURE OF FURNACE GASES
Filed Aug. 9, 1943   9 Sheets-Sheet 2

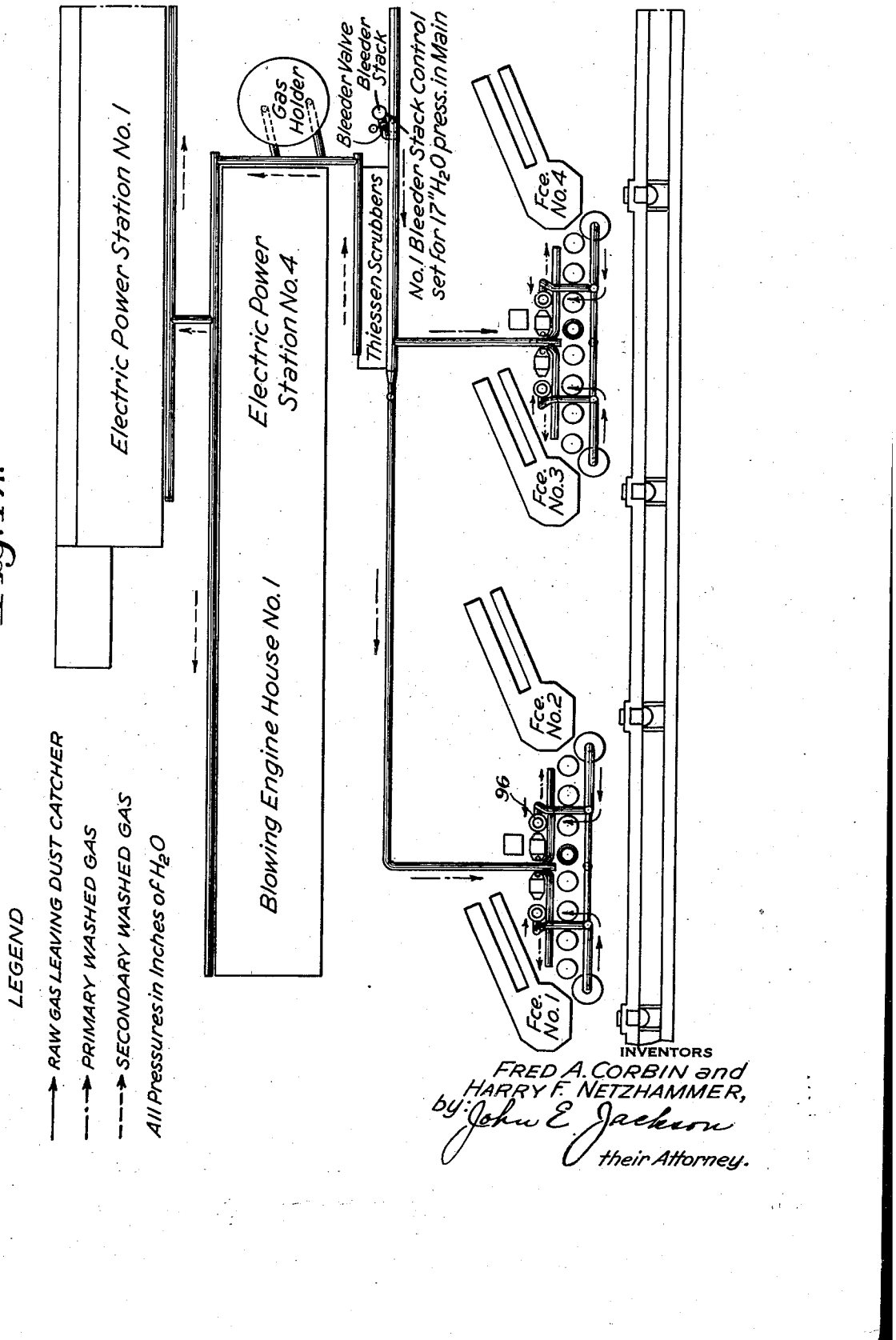

INVENTORS
FRED A. CORBIN and
HARRY F. NETZHAMMER,
by: John E. Jackson
their Attorney.

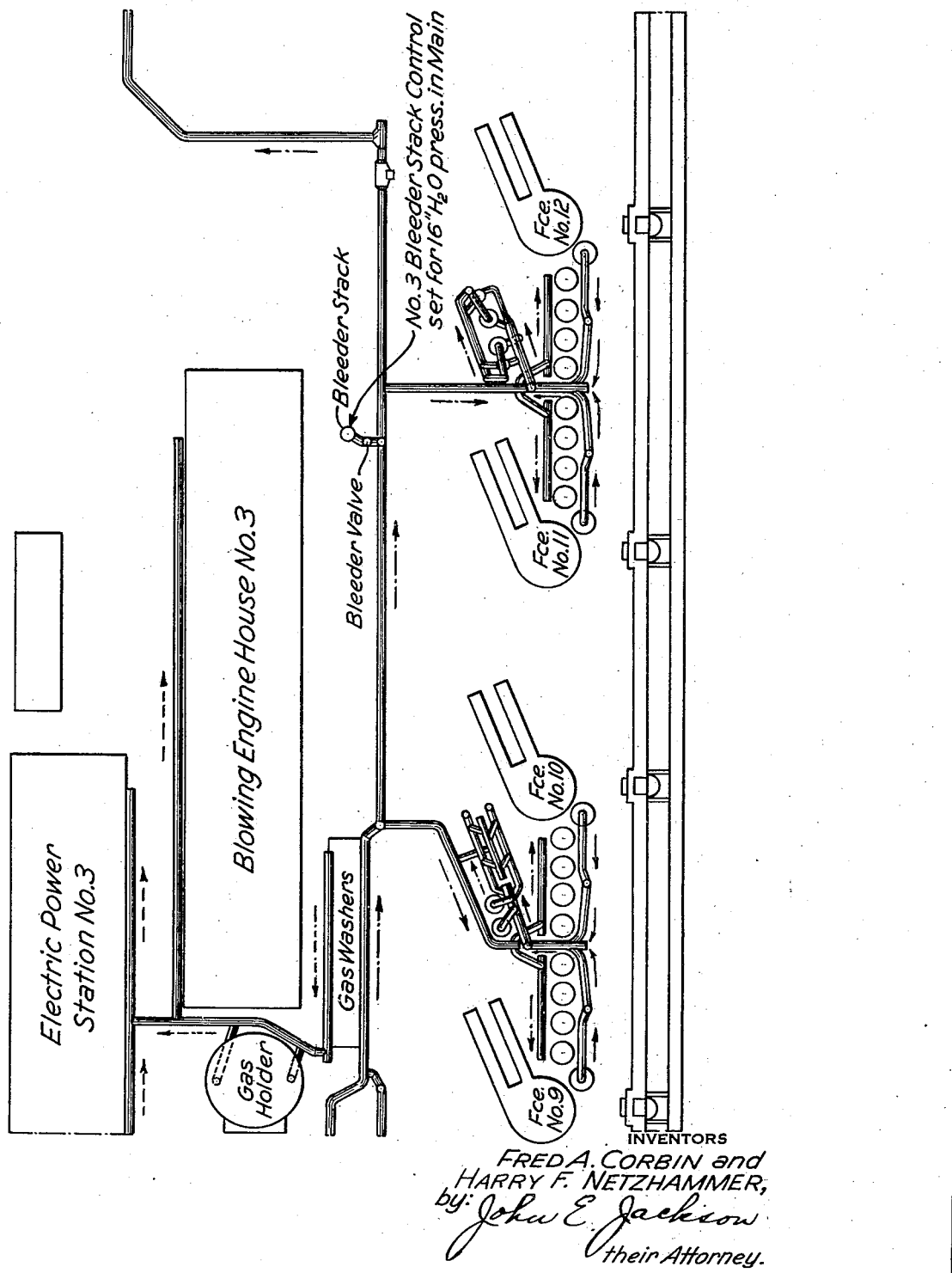

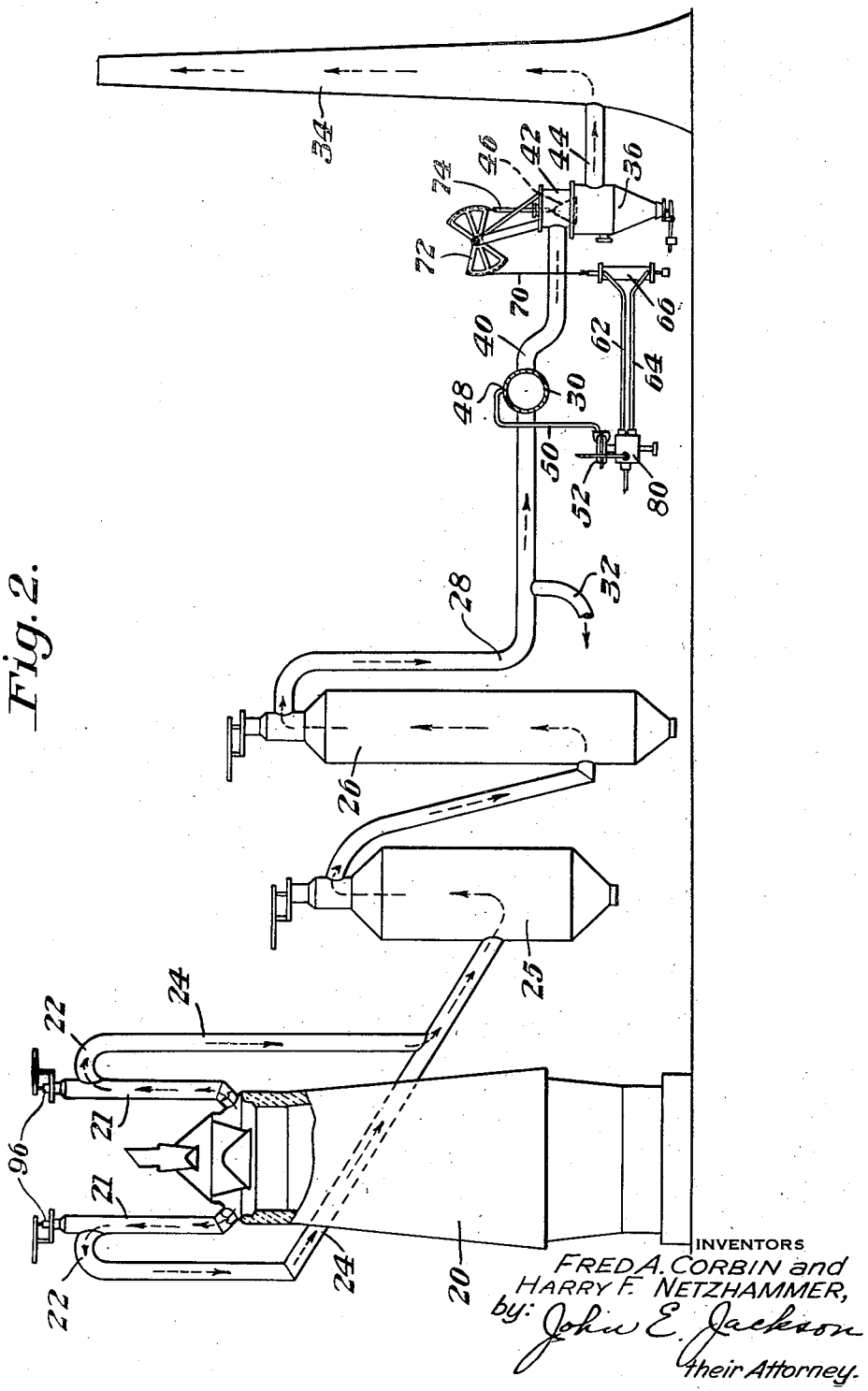

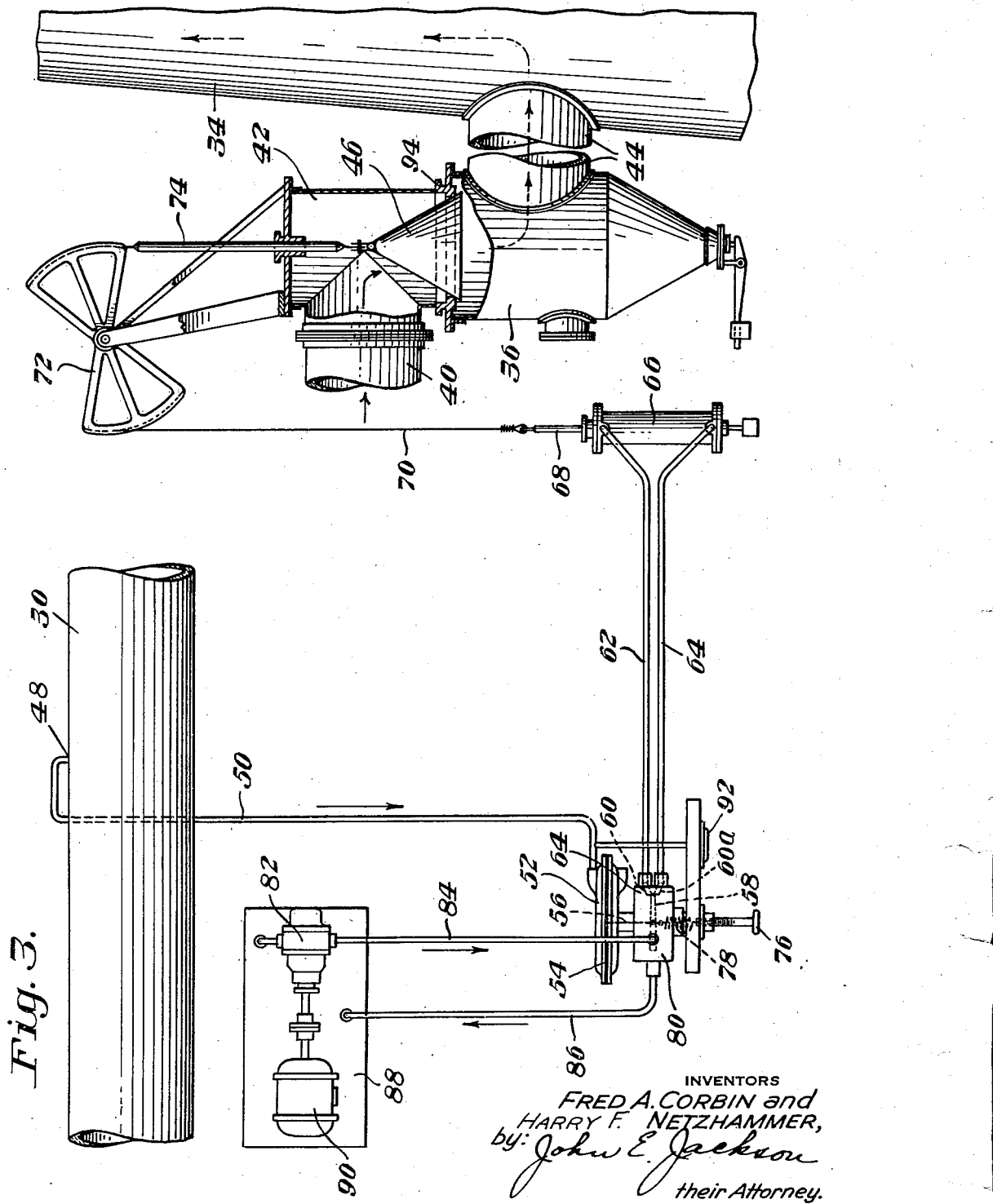

Feb. 12, 1946. F. A. CORBIN ET AL 2,394,595
APPARATUS FOR CONTROLLING THE PRESSURE OF FURNACE GASES
Filed Aug. 9, 1943 9 Sheets-Sheet 6

INVENTORS
FRED A. CORBIN and
HARRY F. NETZHAMMER,
by: John E. Jackson
their Attorney.

Feb. 12, 1946.   F. A. CORBIN ET AL   2,394,595
APPARATUS FOR CONTROLLING THE PRESSURE OF FURNACE GASES
Filed Aug. 9, 1943   9 Sheets-Sheet 8

INVENTORS
FRED A. CORBIN and
HARRY F. NETZHAMMER,
by: John E. Jackson
their Attorney.

Feb. 12, 1946.   F. A. CORBIN ET AL   2,394,595
APPARATUS FOR CONTROLLING THE PRESSURE OF FURNACE GASES
Filed Aug. 9, 1943   9 Sheets-Sheet 9

INVENTORS
FRED A. CORBIN and
HARRY F. NETZHAMMER,
by: John E. Jackson
their Attorney.

Patented Feb. 12, 1946

2,394,595

UNITED STATES PATENT OFFICE 2,394,595

APPARATUS FOR CONTROLLING THE PRESSURE OF FURNACE GASES

Fred A. Corbin, Gary, and Harry F. Netzhammer, Hobart, Ind.

Application August 9, 1943, Serial No. 498,012

4 Claims. (Cl. 266—13)

In the operation of blast furnaces in the production of pig iron, the gas produced during the smelting of the ore is utilized in various ways in gas consuming units disposed at various locations in the plant. For each long ton of pig iron made, there are produced from 125,000 to 150,000 cubic feet of top gas (reduced at atmospheric temperature and pressure). Somewhat less than one-third of this necessary for heating the hot blast stoves. A small proportion is needed for gas engines to drive the furnace blowers, provided a cylinder blowing engine is employed.

The remainder of the gas is available for other power purposes, including the boiler plant and the plant generating electric power from the gas which electricity is supplied to the blast furnace and steel mills. Also, some electricity is required for driving pumps for the cooling water.

The maintenance of uniform conditions of gas supply for the foregoing gas consumer system is an important factor in satisfactory operations. If, from any cause, as for example, increasing the volume of the wind supplied to the furnace, the volume of gas produced in a blast furnace is increased beyond the amount consumed by the gas system, the additional load on the gas mains and primary washers set up by such excess gas volume creates a back pressure on the furnaces to such an extent that the large bells of the furnaces will not open until the furnace bleeders are opened for relief of the top pressures. Such necessity both disrupts the furnace operation and gas distribution through the gas system and creates a serious gas and dust hazard over the plant and over wide areas around the plant.

On the other hand, deficiencies in gas pressures also disrupt operation of the gas system, and deficiencies in the gas supply must be supplemented by another source of fuel, which involves the purchase and shipment of such other fuel, which is usually oil, and the use of such at needed stations in the gas system.

In order to establish a working range between the blast furnace and the blast furnace gas consumer system, which range obviates the disadvantages above mentioned, and other disadvantages arising from too much or too little gas, while establishing as low a gas main pressure as possible and still supply sufficient gas pressure to assure maximum operation of the gas consumer units. This object was accomplished in accordance with the present invention by installing automatic pressure regulators in the gas main for controlling the furnace bleeders. Such automatic system of regulation maintains the main pressure substantially constant, thus establishing a working range between both the furnace and the gas consumers.

The invention will be understood more readily by referring to the accompanying drawings, wherein:

Figures 1A, 1B and 1C are each schematic layouts of successive portions of a typical blast furnace plant, the views taken in sequence illustrating the complete plant, the views showing the locations of the automatic controls of the present invention;

Figure 2 is a diagrammatic view of a blast furnace and certain of its associated parts, the view showing the installation of an automatic control and its location;

Figure 3 is an enlarged view of the automatic control shown in Figure 2.

While the invention is described and illustrated in connection with a blast furnace plant, it will be understood that it is of more general application, and it is directed in its broadest aspect to an automatic gas pressure control placed in a gas main between a gas generator and gas consuming instrumentalities whereby a predetermined gas pressure is maintained in the line and the consuming instrumentalities are supplied with a constant amount of gas under the said constant predetermined pressure. As applied to the blast furnace system, the invention comprises providing the gas main from the blast furnace gas generator with the automatic pressure control means installed in the gas main between the primary cleaners and the stoves, boiler house, and other gas consuming installations, the pressure control means being adapted to be set at a given predetermined pressure and hold that pressure throughout the furnace operation, so that the gas consuming installations will always be supplied with a constant and adequate gas supply, excess pressures in the gas main due to excessive gas generation in the blast furnace or furnaces being bled automatically by the automatic pressure control means, subsequent to the passage of the gas under excess pressure through the control means, through the bleeder stacks, opening of the bleeder valves on the furnace being almost completely eliminated, thereby correspondingly eliminating interruption to furnace operation.

Figure 1B:
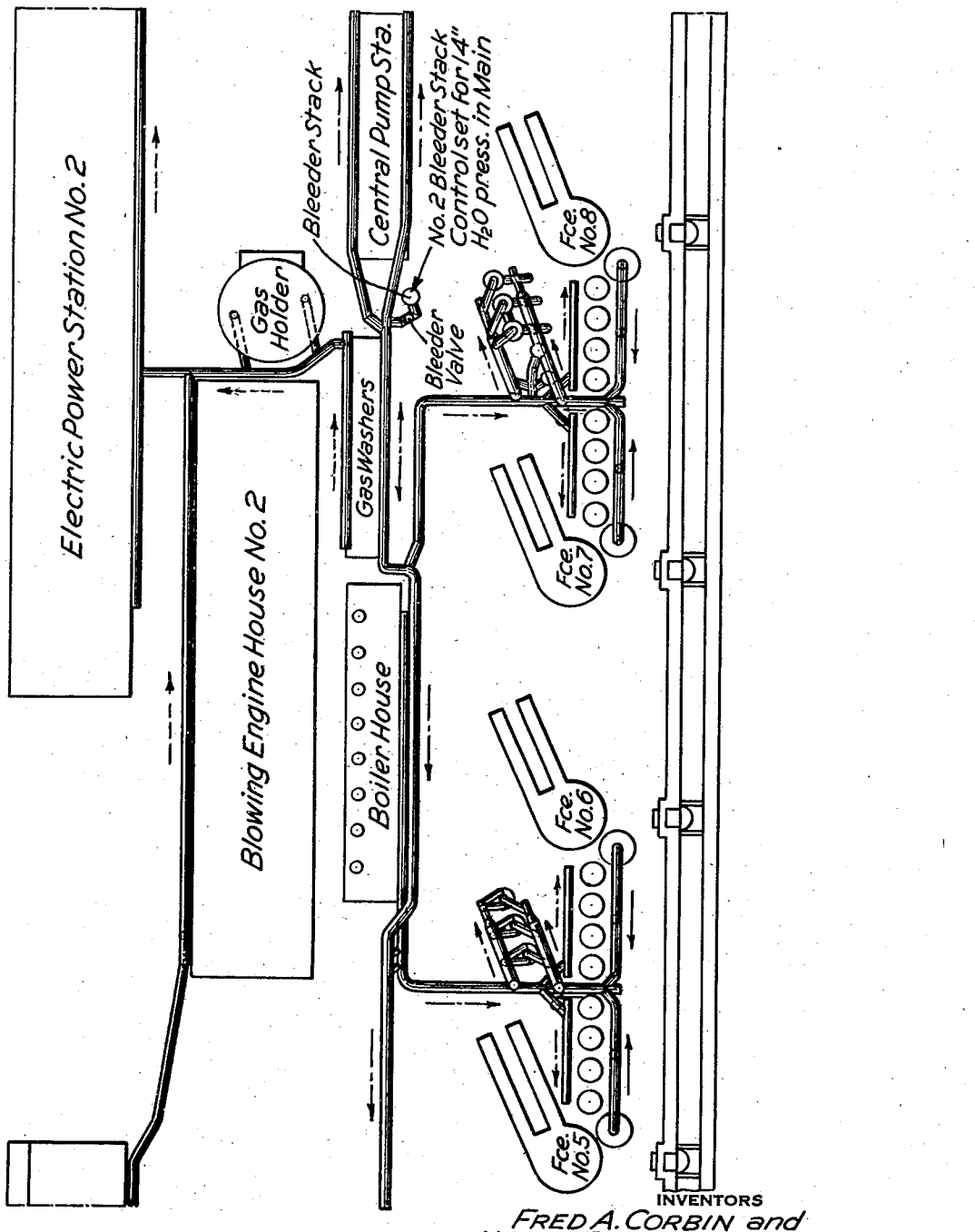
Figure 4:
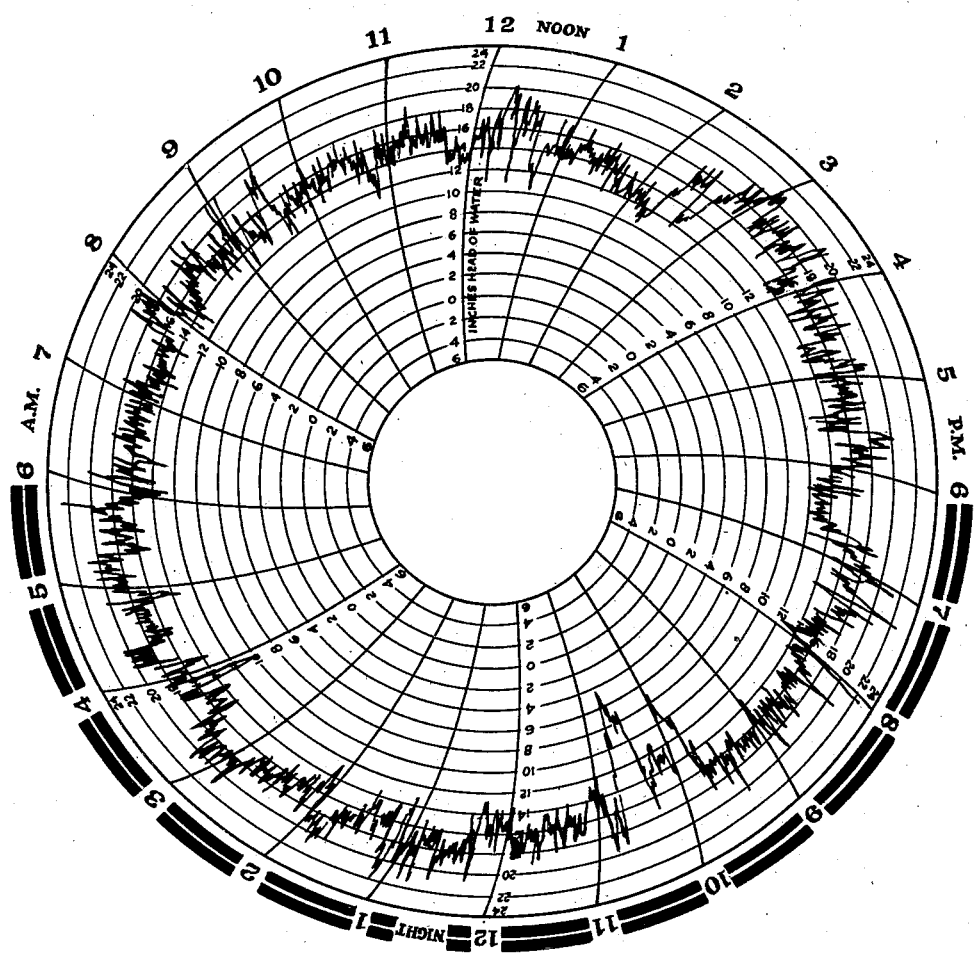
Figure 5:
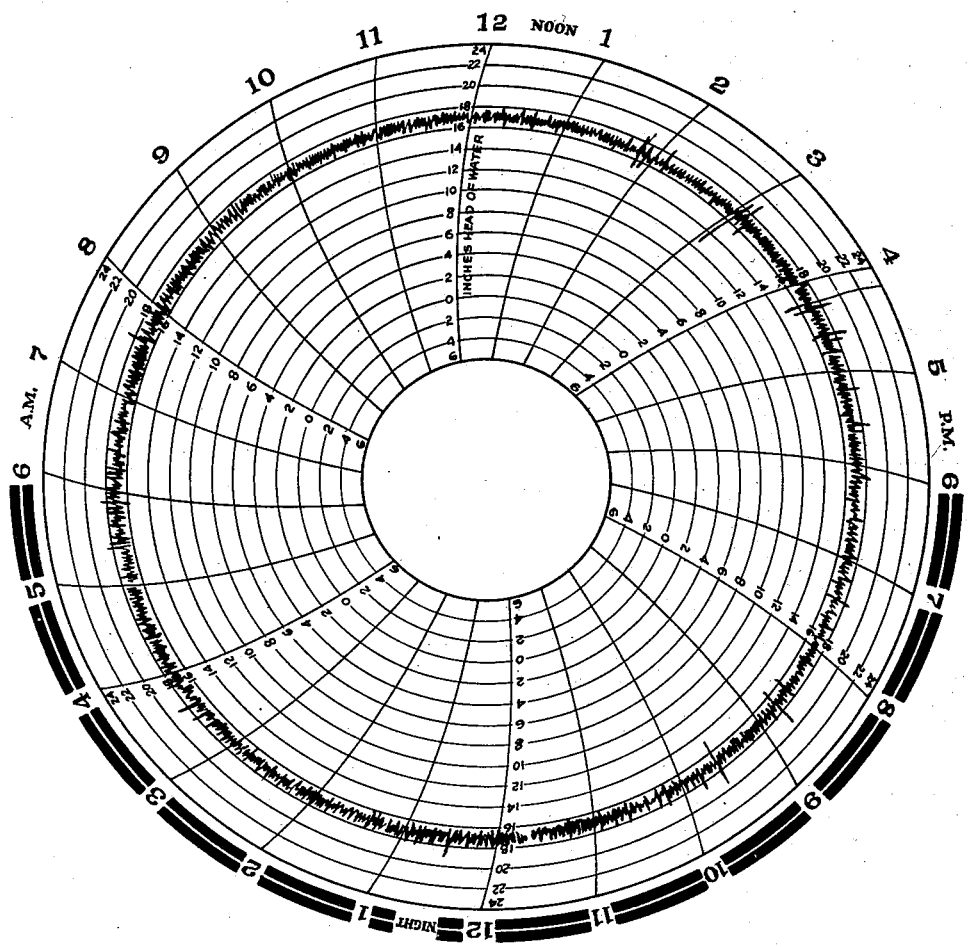
Figure 6:
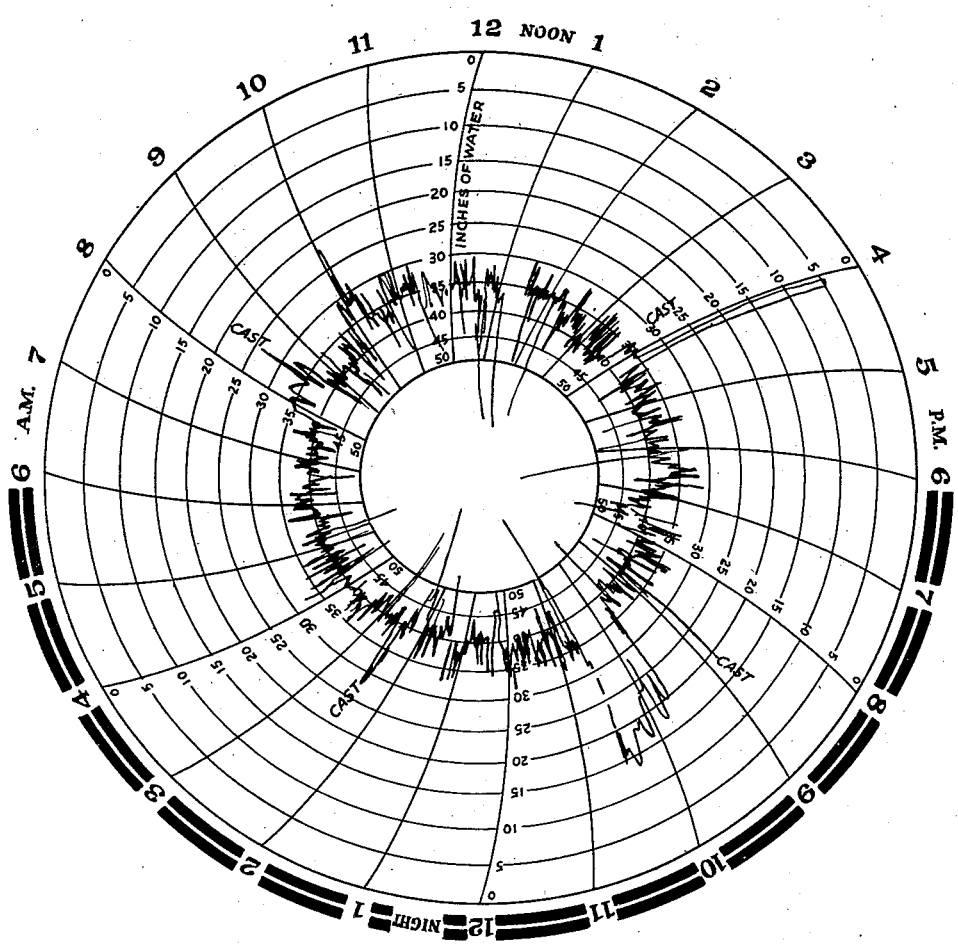
Figure 7:
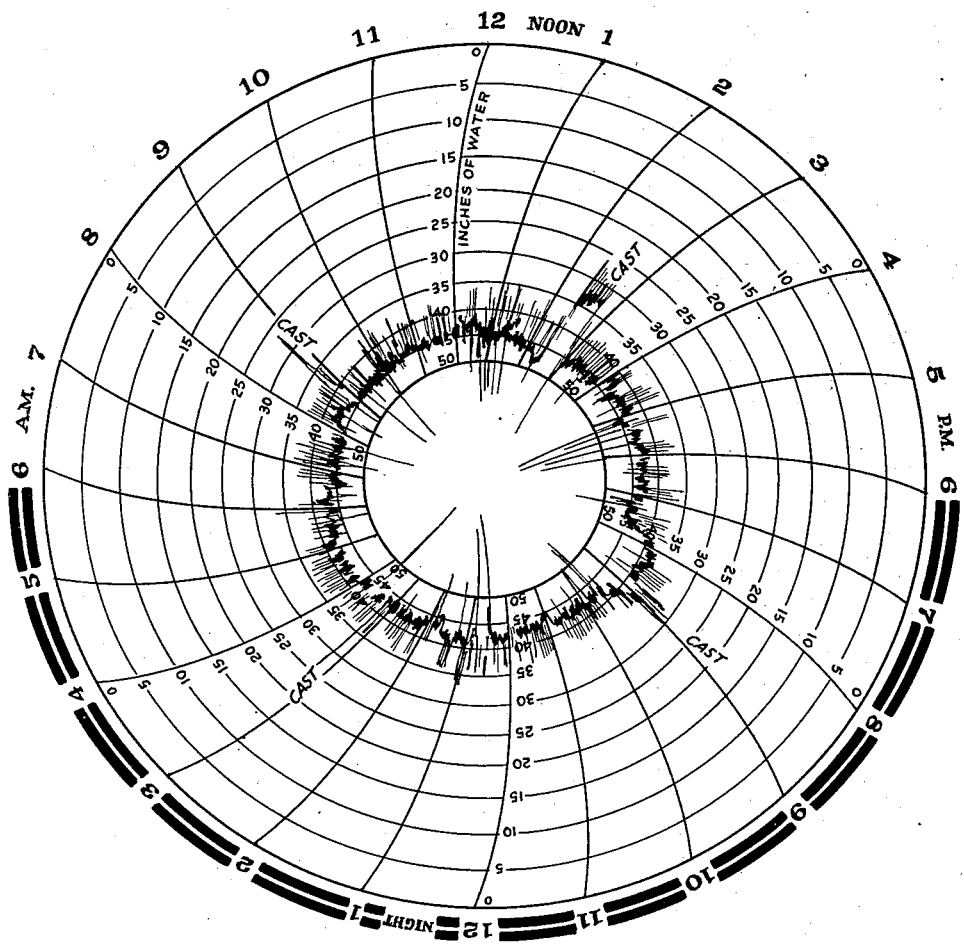

Referring more particularly to the drawings, there is illustrated in Figures 1A, 1B and 1C, a diagrammatic layout of a typical blast furnace plant, which is illustrated as embodying twelve blast furnaces, together with hot-blast stoves, boiler houses, power houses, and other gas consuming installations. In view of the self-explanatory legends applied to the respective views, it is thought to be not necessary to discuss them in detail. These drawings indicate the location of the automatic pressure control installations which are between the cleaning apparatus for the gas and the bleeder stacks. These stacks vent excess pressures of gas to the atmosphere but they are not to be confused with the bleeder valves, or explosion doors, on the blast furnaces. The use of the automatic regulating equipment renders almost entirely unnecessary any opening of the furnace bleeder valves at any time, as contrasted with frequent openings thereof with attendant dust and gas hazard and disruption of furnace operation.

In the layout shown in Figures 1A, 1B and 1C, the blast furnaces and gas consumers especially No. 2 and No. 4 boiler houses were affected by improper gas control prior to the installation of the present automatic equipment. It may be noted in connection with the diagrams of the plant layout, that at the time that the gas mains and washers were installed, the blast furnaces were blowing somewhere in the neighborhood of 50,000 to 60,000 cubic feet of wind per minute, but at the present time, the demands for increased production for the war effort have caused the furnaces to increase their wind and the 1,000-ton furnaces have increased their wind as high as 94,000 cubic feet per minute, producing a corresponding amount of blast furnace gas. This additional load on the gas mains and primary washers created a back pressure on the furnaces to an extent that it was often necessary to open the furnace bleeders and relieve the top pressure before the large bells would open, creating a disruption in furnace operation and gas distribution.

As has been pointed out above, the blast furnace gas consumers, as well as the blast furnaces, especially No. 2 and No. 4 boiler house, were affected by improper gas regulation. In the past there was considerable range through which the pressure in the gas main could vary and still not affect blast furnace operation or boiler operation. However, under existing conditions, the boilers and gas engines have a corresponding increased load which parallels that of iron production. Any deficiency in blast furnace gas, due to improper pressure regulation, must be supplemented by another source of fuel at No. 4 boiler house. As has been noted above, this involves the purchase and freight of another fuel, usually oil, for use while sufficient quantities of blast furnace gas are being bled into the air to enable the large bells of the furnaces to open.

As has been pointed out above, in order to establish a working range between the blast furnaces and the blast furnace gas consumers, it became imperative to establish as low a main pressure as possible, and still supply sufficient gas pressure to assure maximum boiler operation. This was accomplished by replacing the old gas main bleeder regulators which were manually operated at more or less regular intervals in accordance with the pressure of the gas in the main at the particular moment, by automatic pressure regulators, as is described herein, which regulators maintain the main pressure substantially constant.

Referring now to Figure 2 of the drawings, one of the blast furnaces is indicated at 20, having the usual uptakes 21 and offtakes 22 for the gas, the offtakes opening into the downcomers 24, from which the gas enters into the dust catcher 25 and then into the primary washer 26. It then passes through the cross-main 28 to the header-main 30, a portion of the gas from the cross-main being led to the stoves (not shown) through branch pipe 32. Surplus gas is led from the header-main 30 to the bleeder stock 34, the header-main 30 supplying gas to the boiler houses and other gas consuming units.

Between the header-main 30 and the bleeder stack 34 is a valve chamber 36, into which the gas passes through line 40 from the header-main. The line 40 opens into the top 42 of the valve chamber 36 and gas can leave the valve chamber 36 through line 44 and thence into the bleeder stack 34.

Flow of gas through valve chamber 36 is controlled by a bell valve 46, the valve 46 opening only when a gas pressure in excess of a predetermined value exists in the header-main 30, such excess gas therefor passing to the bleeder stock.

The valve 46 is controlled automatically by any one of a number of mechanisms, that illustrated in the drawings being an example of one type of suitable control.

As shown in the drawings, the header-main 30 is tapped as is indicated at 48 to receive an impulse line 50, which is connected into housing 52 containing a diaphragm 54. This diaphragm 54 is connected to push-pin 56, which in turn actuates a jet pipe 58 which is mounted for suitable movement relative to ports 60 and 60a in a distributor 64. These ports 60, 60a are connected respectively to pipes 62, 64, which lead respectively into the upper and lower ends of a hydraulic cylinder 66 in which a piston 68 operates. Piston 68 is connected to a cable 70 which passes over a rocking segment 72 and thence is connected to a rod 74, this rod being tied to the bell valve 46, which is suspended from the rod.

The diaphragm 54 constitutes the operating member for the jet pipe, and this diaphragm is operated by pressure transmitted to it through impulse line 50. The diaphragm is adapted to be set for operation at any desired predetermined pressure, adjustment of the diaphragm and jet pipe being effected by means of an adjusting slider 76 and adjusting screw spring 78.

The jet pipe 58 and associated parts are enclosed in a housing 80. Hydraulic fluid, such as oil, is introduced into the housing 80 under pressure of a pump 82, through pipe 84 which communicates with the jet pipe 58, and returns through pipe 86 to storage receptacle 88. The pump 82 is driven by motor 90. For indicating pressures, a pressure gauge 92 may be tapped into the impulse line 50.

In operation, the pressure in the header-main 30 operates through pipe 50 on the diaphragm 54, which can be set to operate at any desired pressure through adjustment of the slider 76. When the pressure in the header-main 30 exceeds that for which the diaphragm 54 is set, the diaphragm transmits such pressure, which rests on it, to the jet pipe 58 through the pin 56. The adjusting spring 78 is pushing from below. It has been tightened by the adjusting slider 76 so as to balance the power of the diaphragm at the predetermined pressure setting so as to hold this jet pipe in neutral position while the pressure is existing in the header-main 30.

This jet pipe 58 is a pipe which is arranged to swing about a hollow and horizontal pivot. An operating liquid, which normally consists of a pressure oil of about 75 lbs. per square inch of pressure, which oil is introduced into the jet pipe through the hollow pivot to which the pipe 84 is connected, the oil being forced therethrough under pressure of the pump 82. This pressure oil streams through the jet pipe and it leaves it through the nozzle with full energy. In the housing 80, facing the nozzle of the jet pipe, are the two closely adjacent orifices 60 and 60a, which orifices are of the inside diameter of the nozzle, both of which orifices are connected by pipes 62 and 64 with the cylinder 66 on both sides of the piston 68. In the central position of the jet pipe, which is the neutral position, the oil stream from the nozzle strikes equally on both orifices.

Now, if the gas pressure in the header-main 30 increases above the adjusted valve on account of a stronger supply or of a smaller consumption of gas, the pressure of the diaphragm 54 will become correspondingly stronger and it will outweigh the pressure of the spring 78. The spring consequently is pressed together, and the jet pipe, which is between the push-pin 56 and the spring, will be moved downwardly as viewed in Figure 3, and the movement will be so much the more, the stronger the increase of the gas pressure becomes. Thus, the oil stream strikes more and more, on the orifice 60a, so that the oil pressure in the pipe 64 increases proportionally and decreases in pipe 62. The piston 68 therefore is caused to rise, and the segment 72 rocks under the released weight of the valve 46 and bar 74, so that the valve is lowered from its seat 94 and pipes 40 and 44, are thus brought into communication, and the excess gas allowed to bleed through stack 34, it being burned at the top of this stack.

Thus, the equilibrium between supply and consumption of the gas is restored again and the force of the adjusting spring can push the jet pipe 58 back again. In that instant when the gas pressure in the line 30 is equal to the predetermined set valve of the control mechanism, the jet pipe 58 will find itself in its central position and the oil stream strikes equally again on the orifices 60 and 60a. Then pressure on both sides of the piston thus is equally strong and the new position of the piston remains fixed until the pressure in the header-main drops below the pressure setting of the control, at which instant the reverse operations take place and the jet pipe comes opposite to the orifice 60, causing the piston 68 to pull the valve 46 to its closed position.

As is shown in Figures 1A, 1B, and 1C, the illustrated plant layout is provided with three of these automatic controls, namely, adjacent to No. 1 bleeder stack, No. 2 bleeder stack, and No. 3 bleeder stack. Before installation of the automatic control on No. 1 bleeder stack, the gas pressure varied from a low of five inches of water to a high of twenty-three inches of water pressure. After installation of the controls, it is found in practice that the pressure is maintained constantly at seventeen inches of water, or whatever pressure is desired, depending on the variation in operation.

The gas pressure in the header-main near No. 2 and No. 3 bleeder stacks before and after installation of the controls, is similar to No. 1 except that the control pressure is set to maintain the pressure necessary for proper distribution of gas to consumers served in this area.

The regulated gas bleeding not only controls the gas pressure throughout the mains, but helps to determine the supply of gas available for the various consumer units. It also affords means whereby there can be more accurately determined the gas bled and distributed throughout the entire blast furnace gas system and to be able to control and determine the supply of fuel results in a more efficient and greater application of it.

In addition to the foregoing, the installation of the automatic controls not only holds the gas pressures at the top of the furnace to within a range permitting bell operation, but it is found in practice that an almost uniform top pressure is being maintained. Prior to the installation of the automatic controls no definite top pressure trend could be noted, but since the installation of the automatic controls, a definite trend is established towards a uniform top pressure.

Also, results obtained in practice show definitely that the gas pressure regulation reflects back through the furnace and results in a more constant blast pressure to the furnace. Since this is reflected back through the burden, there is little doubt but what furnace operation has been greatly improved and the slipping of the burden vastly reduced.

Also, the load on the blowing engines has been reduced and more air is being delivered to the furnaces due to controlling the erratic furnace top pressure. Likewise, the opening of the bleeders 96 on top of the furnace in order to relieve the excessive pressure hindering the opening of the bells has been almost entirely eliminated. This means that the dust and ore that was being blown out of these bleeders and causing a hazard to the plant and community, has been eliminated, as well as the detrimental effect on machinery and equipment.

The high top pressures formerly encountered were continually causing the large bells to hang, thereby requiring constant vigilance to prevent the breaking of bell cylinders and liners. This has been eliminated by the present invention. Also, the blowing of auxiliary seals that sometimes were not capable of absorbing the high pressures resulting from furnace slips, has been relieved, as well as the necessity of maintaining large labor crews in cleaning up accumulated ore-dust in the plant yard and in cleaning the furnace tops, which was required to be done continually, this labor now being diverted to advantageous use elsewhere. Furthermore, a very great improvement in the reduction of dirt accumulation in the mains of the blast furnace gas system has resulted from the present invention.

Many other advantages are present throughout the plant because of the improvements of the present invention. Thus, the controlled pressure of gas to the washers results in a steady and uniform volume of gas flowing through the washers, thereby improving the efficiency of the washers. Before the controls were installed, it was impossible to maintain a steady flow through the washers. A variation in flow from 10,000 to 20.000 cubic feet per minute was not unusual. With the controls installed, the flow is maintained constantly at 15,000 cubic feet per minute. Prior to the installation of the controls, daily analysis of the gas showed a dust content of 0.012 to 0.021 grain per cubic foot. Since the controls have been installed, it has been showing approximately 0.010 grain per cubic foot daily, with the exception due to overloading of the washers on account of too many being shut down for cleaning or repairs.

Also, improved stove operation is effected by the present invention. It is a well established fact that one of the first steps in good gas combustion is the regulation of the gas pressure, certain of the stoves for the furnaces illustrated in Figures 1A, 1B and 1C have inspirating burners, a constant gas flow inspirates air far more satisfactorily than a surging gas supply. Analysis of the gas taken before the controls were used indicated very poor combustion and frequent adjustments of the burners were necessary in order to obtain efficient combustion of the gas. Since the installation of the controls, efficient combustion can be maintained with infrequent burner adjustments. Furthermore, all the stoves have a tendency to set up a puffing condition resulting from gas surges. With the controls and with a proper setting of the burners, this tendency is eliminated, and a smooth efficient flame now is attained.

The foregoing are a few of the advantages of the present invention. Very substantial savings in equipment, materials and money are effected by the automatic controls of the present invention, which savings extend throughout the entire plant.

We claim:

1. A blast furnace system comprising, in combination, a plurality of blast furnaces, a gas main connected to the blast furnaces, instrumentalities interconnected with the gas main for utilizing gases produced in the furnaces, a plurality of gas bleeders connected to the gas main for relieving gas pressure therein above a predetermined constant pressure, and gas pressure control mechanisms intermediate the furnaces and each bleeder, each mechanism including control valve means disposed intermediate its bleeder and the gas main supplying gas to the said gas-utilizing instrumentalities, and operating mechanism for the valve means automatically operable responsively to deviations in gas pressures in the system from the said predetermined constant pressure in selected stations in the system for maintaining the gas pressure throughout the system continuously substantially constant at the said predetermined value, thereby maintaining a constant supply of gas to the gas-utilizing instrumentalities independently of variable conditions of operation in any particular furnace.

2. A blast furnace system comprising, in combination, a battery of blast furnaces, each furnace of which battery is delivering gas at differing and varying rates, a gas main common to the said furnaces for receiving gas therefrom, instrumentalities connected to the said gas main for consuming the gas produced in the furnaces, means for receiving the gas delivered from the furnaces at the said differing and varying rates and for supplying the said gas to the gas-consuming instrumentalities in a steady flow at a constant pressure, a plurality of bleeders distributed in the system intermediate the furnaces and gas-consuming instrumentalities, and gas pressure control mechanism for each bleeder, the said mechanism including means operable responsively to deviations in gas pressures in the system from the said constant pressure in selected stations in the system for continuously maintaining the said pressure substantially constant throughout the system, thereby maintaining a constant supply of gas to the said gas-consuming instrumentalities independently of variable operating conditions in any of the said furnaces.

3. A blast furnace plant comprising, in combination, a plurality of blast furnaces, a gas main adapted to receive blast furnace gas from the furnaces, a plurality of gas-consuming stations connected to the gas main for receiving and utilizing blast furnace gas from the said gas main, the said gas-consuming stations being at various remote distances from the blast furnaces, a plurality of gas bleeders connected to the main at selected spaced locations adapted to relieve excess gas pressures in selected portions of the main, and gas pressure control mechanisms intermediate the gas main and each bleeder, each of the control mechanisms including control valve means adapted to control passage of gas from the gas main to the bleeders, and operating mechanism for the valve means automatically operable responsively to deviations in gas pressures in the gas main from a predetermined value for maintaining the gas pressure constant throughout the gas main at the said predetermined value, thereby maintaining a constant supply of gas to all of the gas-utilizing stations independently of variable conditions of operation in any particular furnace and irrespectively of the distance of the gas utilizing stations from the said blast furnaces.

4. A blast furnace plant comprising, in combination, a plurality of blast furnaces, a gas main adapted to receive blast furnace gas from the furnaces, connections between the furnaces and the said gas main, a plurality of gas-consuming stations connected to the gas main for receiving and utilizing blast furnace gas from the said gas main, the said gas-consuming stations being at various remote distances from the blast furnaces, and means for maintaining a predetermined constant pressure of gas throughout the gas main and gas-consuming stations, the said means including bleeder instrumentalities for bleeding excess gas pressure from the gas main to the atmosphere and control mechanisms intermediate the gas main and bleeder instrumentalities, the said control mechanisms including control valves adapted to control passage of gas from the gas main to the bleeder instrumentalities, and operating mechanism for the valves automatically operable responsively to deviations in gas pressures in the gas main from the said predetermined constant pressure, thereby maintaining a constant supply of gas to all of the gas-utilizing stations independently of variable conditions of operation in any particular furnace and irrespectively of the distance of the gas utilizing stations from the said blast furnaces.

FRED A. CORBIN.
HARRY F. NETZHAMMER.